O. W. BENSTER.
LOOM FOR WEAVING WIRE FABRIC.
APPLICATION FILED NOV. 23, 1908.

UNITED STATES PATENT OFFICE.

OLIN W. BENSTER, OF TOLEDO, OHIO.

LOOM FOR WEAVING WIRE FABRIC.

1,152,592.  Specification of Letters Patent.  Patented Sept. 7, 1915.

Application filed November 23, 1908. Serial No. 464,129.

*To all whom it may concern:*

Be it known that I, OLIN W. BENSTER, a citizen of the United States, and a resident of Toledo, in the county of Lucas and State of Ohio, have invented a certain new and useful Loom for Weaving Wire Fabric; and I do hereby declare the following to be a full, clear, and exact description of the invention, such as will enable others skilled in the art to which it appertains to make and use the same, reference being had to the accompanying drawings, and to the figures and letters of reference marked thereon, which form a part of this specification.

My invention relates to the manufacture of wire cloth of the "diamond mesh" type, and particularly to cloth of this character which is used largely for fire-escapes and building work, and also for interior gratings or partitions, such as banking house cages, or the like, and which is composed of crimped sections of wire interwoven diagonally of the run of the cloth. Owing to the peculiar weave of this cloth, its manufacture has heretofore been carried on solely by hand, and has been restricted to sections not exceeding four or five feet square, as otherwise its character would cause it to buckle and be difficult if not impossible to handle.

The object of my invention is to overcome the difficulties encountered in the hand process of weaving cloth of this character by the provision of a machine or loom which is adapted to rapidly and efficiently weave such cloth in any desired width or length and to wind it in bundles for the purpose of handling or shipping as in the case of ordinary woven wire fabrics.

The operation, construction and arrangement of the parts of a hand operated form of my invention are fully described in the following specification and illustrated in the accompanying drawings, in which,—

Fig. 4 is a top plan view of
the heddle-chain track and heddle operating-bars with the beater-shaft, a section of the weaving end of the fabric, and the positions of feed of the warp and woof-wire sections to the loom shown in diagram.
Fig. 5 is an inner elevation of a section of the heddle-chain and its track.

Figure 1:
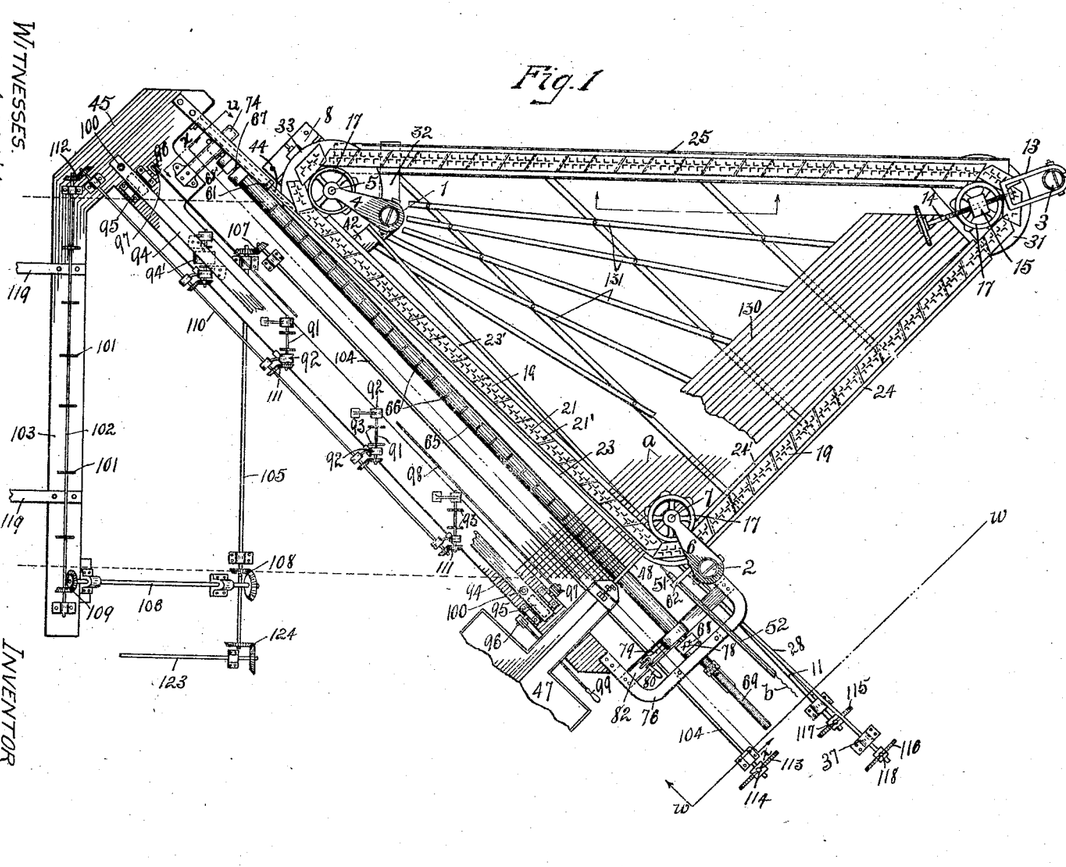
Figure 1 is a top plan view of a loom embodying my invention with portions of the same broken away and showing a portion of a fabric being woven.
Figure 2:
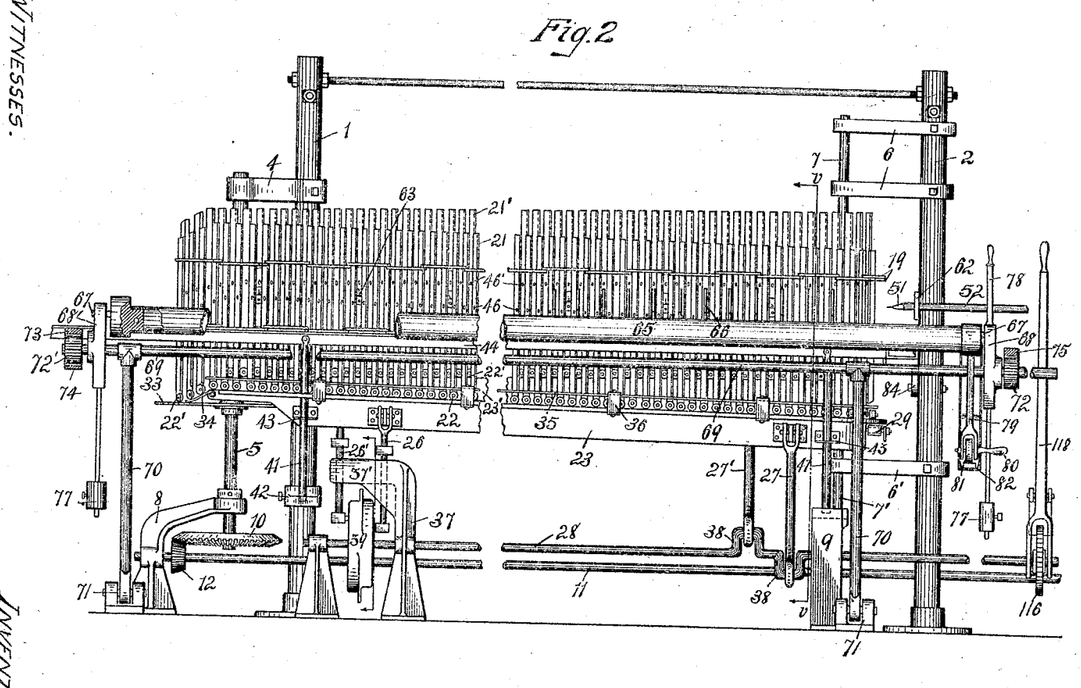
Fig. 2 is an enlarged transverse vertical section of the loom
50 on the line $x\ x$ in Fig. 1 with portions thereof broken away.
Figure 15:
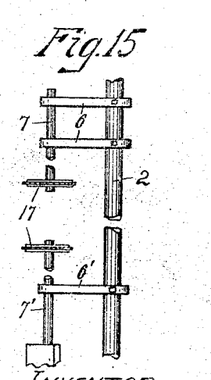
Fig. 15 is an elevation of the sprocket-wheel carrying shaft at one side of the loom and portions of their bearing-arms.

Referring to the drawings, 1 and 2 designate posts or uprights which rise from the floor or other base support at opposite side portions of the loom, and 3 a similar standard which is disposed at the rear end of the loom. Journaled in the free end of an arm 4 (Figs. 1 and 2) projecting outwardly from the post 1 is the upper end of a vertical shaft 5, while journaled in the upper arms 6, 6 and lower arm 6', which project inwardly from the post 2 are the short axially alining vertical shafts 7 and 7', respectively, the inner ends of which are spaced apart as shown in Fig. 15. The shafts 5 and 7' are journaled at their lower ends in the bearings 8 and 9, respectively, the latter of which is of the ordinary pedestal type, while the former is shown as comprising a pedestal having a bearing-arm projecting laterally therefrom to enable the shaft 5 to project therethrough for the purpose of carrying a bevel-gear 10 at its lower end, as shown in Fig. 2. The shaft 5 has rotation communicated thereto from a horizontal drive-shaft 11, which is suitably journaled in the bearings 8 and 9, and carries a bevel-gear 12 in mesh with the larger gear 10. The rear post 3 has arms 13, 13 projecting inwardly therefrom in vertically spaced relation, and carrying the hand-screws 14, 14, which project longitudinally from their inner or free ends and are permitted to have rotary but not longitudinal movements relative to such arms. Threaded to the shanks of these screws for longitudinal adjustment thereon are bearing-blocks 15, 15 in which the opposite ends of a vertical shaft 16 are journaled, as shown in Figs. 1 and 3, thus adapting such shaft for lateral adjustment relative to the post.

Figures 6, 7, 8, 9, 10, 11:
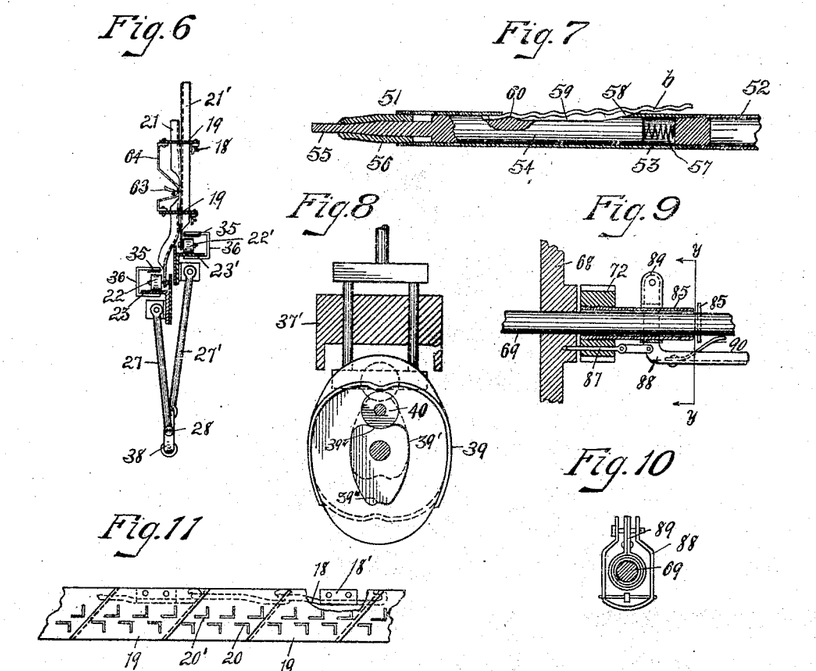
Fig. 6 is a vertical section on the line $v\ v$ in Fig. 2.
Fig. 7 is an enlarged central longitudinal section of the forward end portion of the woof-carrier.
Fig. 8 is an enlarged side view of the cam and a portion of an associated connecting-rod employed to raise and lower one end of the heddle operating-bars.
Fig. 9 is an enlarged view of a portion of the rocking-shaft of the weft-wire beating-mechanism with one of the pinions and associated parts carried thereby in section.
Fig. 10 is a section on the line $y\ y$ in Fig. 9.
Fig. 11 is a plan view of a portion of a sprocket-chain of the heddle-chain with the attached heddle guiding-plates.

Carried in spaced relation by each of the shafts 5, 7, 7′ and 16 are the upper and lower sets of sprocket-wheels 17, 17 around which endless chains carrying the heddles of the loom pass, thus causing the chains when actuated, to have a triangular course of movement. These chains comprise the two vertically spaced sprocket-chains 18, 18 for engagement with the upper and lower sets of sprocket-wheels 17, the links of which chains are provided with horizontally projecting lugs 18′, see Fig. 11, to which horizontal plates 19 are riveted or otherwise rigidly secured. These plates are preferably, but not necessarily, of rhomboidal form and are so arranged that the front and rear edges of alternate plates overlap the like edges of the interposed plates, thus adapting them to have relative pivotal movements as the flexing of the chains during their passage around the sprockets may require. Outer and inner parallel sets of openings 20 and 20′ are provided in the plates 19 of each sprocket-chain for the insertion of heddles 21 and 21′, respectively, which are vertically disposed and intended to have free longitudinal movements in said openings. The openings 20 or 20′ of each set are arranged to alternate with those of the other set and are spaced the width of a mesh apart so that a face of each heddle is exposed at either side of the heddle chain. While the heddles 21, 21′ may be made of any suitable shape, they are shown as comprising short lengths of angle-iron, and are preferably so disposed that one flange of each heddle stands elengthwise of the course of movement of the chain and one stands outwardly from the other set of heddles, as shown in Figs. 1 and 11. Each heddle 21, 21′ carries a roller 22, 22′, respectively, which projects outwardly relative to the other set of heddles and travels on suitable tracks 23, 23′ which are mounted beneath the path of movement of the heddle-chain. It is desirable in practice to place the two sets of heddles as closely together as possible and then to bend the heddles of either or both sets slightly inwardly at their centers so that their inner faces will lie substantially in the same plane, thus narrowing the combined width of their warp-wire receiving parts to a minimum to permit a woof-wire section to be fed close to the outer faces of the heddles of both sets.

Figure 3:
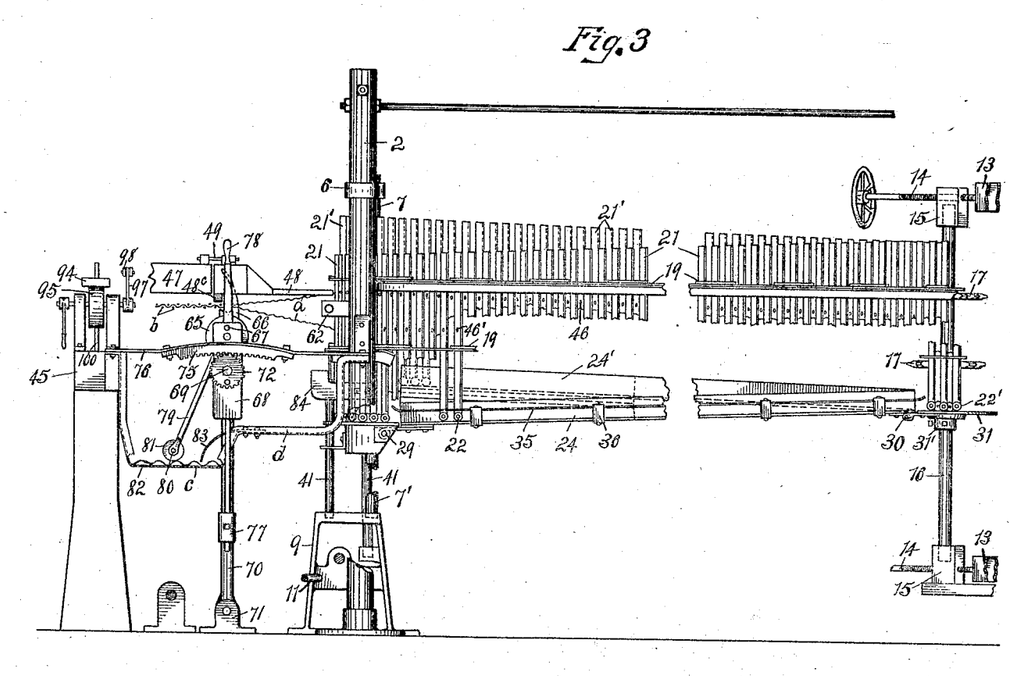
Fig. 3 is an enlarged side elevation of the loom with portions broken away and portions in section on the line $w\ w$ in Fig. 1.
Figures 4, 5:
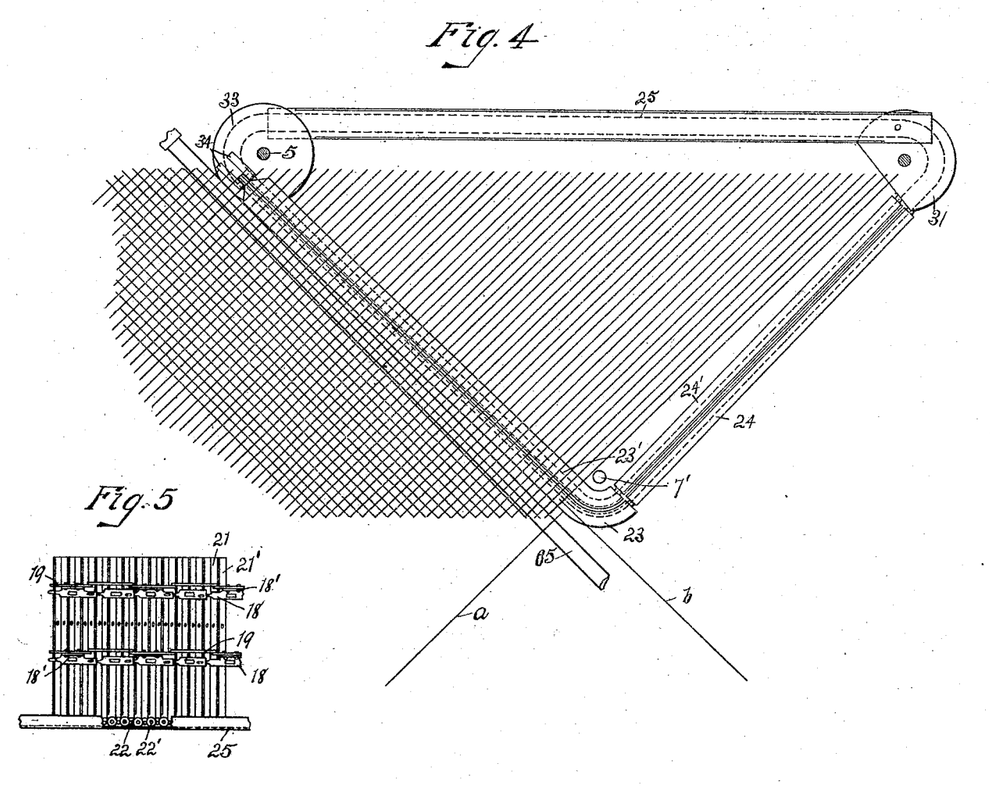

The heddle track is shown in Figs. 2, 3 and 4 as comprising the two parallel front sections or heddle-operating bars 23, 23′, the two parallel side sections 24, 24′, and the opposite side section 25, which latter section is preferably formed of channel-iron, the channel of which is disposed upwardly, while the other sections are preferably formed of angle-iron. The track sections 23, 23′ are supported by the sets of pitmen 26, 27 and 26′, 27′, respectively, which connect with a subjacent crank-shaft 28, as hereinafter more fully described, and said sections have their right ends curved, see Figs. 2, 3 and 4, and pivotally connected, as at 29, to the respective forward ends of the two side sections 24, 24′ with their horizontal flanges meeting the horizontal flanges of said latter sections in a common plane to permit the heddle-rollers 22, 22′ to pass from one to the other of such connected sections. The rear ends of the side sections 24, 24′ are each pivotally connected, as at 30, Fig. 3, to a slotted arm projecting from a plate 31, which plate is loosely carried by the vertical shaft 16, being supported by a collar 31′ thereon, and forms a platform over which the heddles travel in passing to the rear ends of the sections 24, 24′ from the track section 25, the rear end of which is attached to said plate or platform. The track-section 25 has its forward end supported by an arm 32 (Fig. 1) projecting from the upright 1 and terminates in position to receive the heddle-rollers as they leave the disk 33, which is carried by the shaft 5. The heddles on leaving the left end of the track-sections 23, 23′ pass down inclined-ways 34 to the disk 33, one of which ways is pivoted at its rear end to each section 23, 23′ and has its forward end resting freely on the disk 33, as shown in Figs. 2 and 4. The heddle-rollers 22, 22′ are held to their respective tracks by shoe-strips 35, which are secured in position above the track-sections by brackets 36 rising therefrom, as shown in Figs. 2 and 3.

The crank-shaft 28 is journaled in suitable pedestal-bearings 37 in a vertical plane with the heddle-operating bars 23, 23′, and is provided beneath the right ends of said bars with oppositely extending cranks 38, 38 of substantially equal length, to which the lower ends of the pitmen 27, 27' attach, and beneath the left ends of said bars with a double cam member 39, with which the lower ends of the pitmen 26, 26' coöperate. The pitmen 26, 26' are each guided in their vertical movements by an arm 37', which projects from the upper end of one of the bearings 37, and each carries a roller 40 at its lower end. These rollers rest on heart-shaped cam-ledges or shoulders 39', which are reversely formed on the opposite faces of the cam-member 39 and have their large ends disposed nearer to their common axis than their small ends, as shown in Fig. 8, thus causing one pitman to stand at its highest point of movement when the other is at its lowest point of movement as indicated. In order to check the rotation of the crank-shaft 28 at each half revolution, the cam-shoulders 39' have their opposite ends provided with depressions, as shown at 39", Fig. 8, into which the pitman rollers 40 may drop when in register therewith. The relative throw of the cams 39 and cranks 38 is so proportioned that the reciprocatory movements of the pitmen 26, 26' is less than that of the pitmen 27, 27', thus causing the heddle-operating bars 23, 23' to have reverse oscillating-reciprocatory movements imparted thereto at each half revolution of the shaft 28. While cams 39' of the shape shown are preferably employed to operate the pitmen 26, 26', it will be understood that cranks of less throw than the cranks 27, 27' may be used in place of cams if desired.

The heddle-operating bars 23, 23' are guided in their vertical movements by guide-rods 41, (Fig. 2) which rise from the pedestal bearing 9 and an arm 42 projecting from the upright 1. These rods pass through guide-ears 43 projecting from the operating-bars 23, 23', and the forward rods are shown as having their upper ends fixed to a bar 44, which extends from one side of the loom to the other in advance of the heddle-chain. This bar has one end attached to the upright 2 and its other end attached to the frame part 45 at the opposite side of the loom. The lower set of plates 19 of the heddle-chain are intended to rest on the bar 44 while traversing from one side to the other of the loom, thus tending to hold them steady during the vertical movements of the heddles therein to prevent a binding of the latter therein.

The heddles 21, 21' are each provided with an aperture 46, 46', respectively, which are disposed an equal distance from the ends of the heddles and form eyes for receiving the warp-wires $a$ of the fabric being woven. As the two sets of heddles pass over their respective operating-bars or track-sections 23, 23' the sets of eyes 46, 46' therein are vertically spaced and gradually diverge from left to right of the loom in accordance with the relative inclination of said operating bars, as shown in Fig. 2, thus providing a space between the sets of warp-wires for the introduction of a woof-wire $b$, which space is correspondingly narrowed or restricted from one end to the other thereof. This gradual narrowing or restricting of the space between the sets of warp-wires from the right to the left thereof is a very important feature in the practical and economical operation of the loom, as it enables the handling of very short ends of warp-wires at the left of the fabric so that the ends of the warp and woof-wires approximately meet to form or nearly form the last mesh of the fabric at such side instead of forming a broad raw edge which would necessitate trimming and entail a considerable loss of material, as would otherwise be the case.

The warp-wire sections $a$ are intermittently fed to the eyes 46, 46' of the successive heddles of the heddle-chain after the heddles have rounded the sprockets carried by the shafts 7, 7' and started on their movement across the front of the loom. The point of feed of the warp-wires to the heddles may be changed, however, as the width of the cloth to be woven or other conditions may require. As the feed of the warp-wires to the heddles is substantially in line with the sprocket-wheel shaft 7, 7' it is made in sections as shown to permit the warp-wires to pass between its inner ends.

Figures 16, 17, 18, 19:
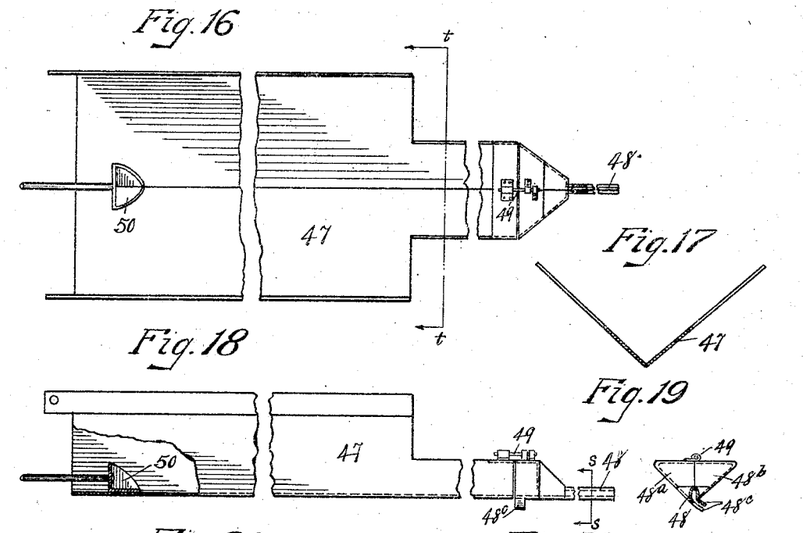
Fig. 16 is an enlarged plan of the warp-wire trough and feed-guide, with portions broken away.
Fig. 17 is a transverse section thereof on the line $t\ t$ in Fig. 16.
Fig. 18 is a side elevation of said trough and feed-guide with portions broken away.
Fig. 19 is a transverse section on the line $s\ s$ in Fig. 18, and Figs. 20 and 21 are front and side elevations of the fabric winding mechanism.

The mechanism shown in the drawings for feeding the warp-wires to the heddles comprises a trough 47 into which the warp-wire sections are intermittently deposited either by suitable mechanism for such purpose or by hand, which trough is shown as being broadened at its rear end to facilitate the dropping of the wires therein, see Figs. 1, 3, 16, 17 and 18. The trough 47 is suitably supported at the right of the loom, as by the right end of the frame part 45, and terminates at its feed end in the restricted nose 48 by means of which the wire sections are guided through the eyes 46, 46' as they successively move into register therewith. As the forward end of a warp-wire, when fed to a heddle, projects a short distance forwardly from the heddle some provision must be made for allowing such end to move laterally from the nose 48 as the heddles and warp-wires advance across the loom during the weaving operation. This is accomplished by vertically dividing the nose portion 48 of the guide or trough into two longitudinal parts 48ª and 48ᵇ, which are hinged to a common pivot 49 projecting from the contiguous end of the trough 47, and are adapted to normally hang by gravity in abutting or closed position, as shown in Fig. 19. When the heddles are moved vertically to shift the positions of the two sets of warp-wires, the forward end of the freshly fed section, which is left projecting within the guide nose 48, moves downwardly and forces the sections of such nose apart sufficiently to permit it to pass laterally therefrom through the slot in the bottom, being guided in such movement by the slightly curved lips 48$^c$, which project downwardly from said hinged parts, as shown in Figs. 18 and 19. A warp-wire section is forced through the trough 47 and into the registering heddle by means of a plunger 50, which is adapted to work forward and backward in the trough and may be either hand or mechanically operated as desired.

The woof-wires $b$ are introduced through the horizontal opening provided between the two sets of warp-wires $a$ adjacent the heddles by means of a woof-carrier 51, which, after being run through such opening, drops the woof-wire therein and is then withdrawn to permit the woof-wire beating-mechanism to operate thereon. The form of woof-carrier 51 shown in the drawings comprises a bar 52, which is of greater length than the woof-wires of the fabric being woven and has its forward end portion provided with a cylinder 53 in which the wire-gripping plunger 54 operates, as shown in Fig. 7. This plunger has its forward end provided with a stem 55, which projects through and normally beyond the conically contracted nose 56 of the woof-carrier due to the influence of a compression-spring 57 thereon, which spring is disposed between the inner ends of the plunger and the cylinder 53. The side of the cylinder 53 is cut away, as at 58, in register with an incut 59 in the plunger side. The incut 59 of the plunger has its forward end normally disposed in advance of the cylinder opening 58 to enable an end of a woof-wire section to be inserted within such incut between the plunger side and cylinder casing, see Fig. 7, and is provided to the rear of such end with a hump or crimp-shaped elevation 60, which is intended to coact with the cylinder casing at the forward end of the opening 58 to grip the end portion of the inserted woof-wire when the plunger is in its normal extended position. When the woof-carrier 51 has reached the point in its forward movement at which it is desired to release the woof-wire, the projected end of the plunger-stem 55 strikes a stop 61, (Fig. 1) which projects inwardly from the left end of the frame part 45, thus forcing the plunger inward against the tension of its spring and effecting a release of the woof-wire. An arm 62 projects from the post 2 and supports the forward end of the woof-carrier when in retracted position and also coöperates with guide fingers 63 carried by the heddle-chain to guide the movements of the shuttle across the loom in advance of the chain. The fingers 63 are carried by vertical strips 64, which connect the upper and lower sets of plates 19 of the heddle-chain at suitable intervals therearound, and are bowed inward toward the heddles at the point of attachment of said fingers, as shown in Fig. 6, to position the guide fingers as close to the front faces of the heddles as possible.

Figures 12, 13, 14:
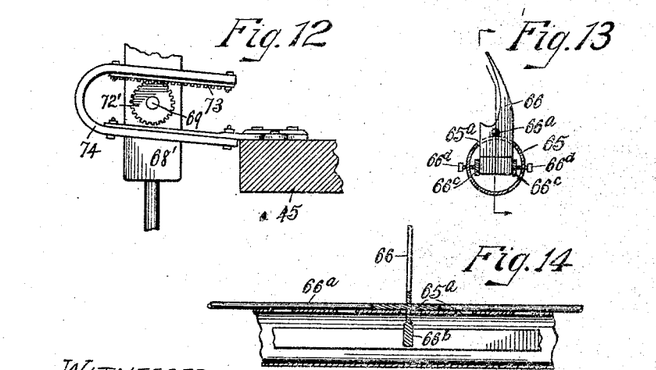
Fig. 12 is an enlarged elevation of a portion of one end of the beating-mechanism taken on the line $u$ in Fig. 1.
Fig. 13 is an enlarged transverse section of the beater-shaft.
Fig. 14 is an enlarged longitudinal section of the beater-shaft.

Referring now to the woof-wire beating-mechanism of the loom 65 designates the beater-shaft, which has a plurality of beater-fingers 66 projecting in the same direction from one side thereof, and has its ends preferably provided with eccentrically disposed trunnions 67, which journal in levers 68, 68', and are disposed to cause the shaft to normally assume a position with the beater-fingers pointing upwardly, as shown in Figs. 1, 2 and 3. The beater-shaft 65 is preferably tubular in form and provided in one side thereof with transversely-disposed slots 65$^a$ through which the beater-fingers 66 project, see Figs. 13 and 14. The fingers 66 are shown as being loosely hung on a rod 66$^a$ extending longitudinally of the shaft 65 on the normal top thereof to adapt them to have lateral oscillatory movements relative to the rod, and have their inner ends weighted, as shown at 66$^b$, to cause the fingers to normally hang in vertical position. The fingers 66 are prevented from oscillatory movements transversely of the shaft by strips 66$^c$, which are disposed within the shaft 65 on opposite sides of the inner end portions of the fingers, and are adjustable by means of screws 66$^d$ to move the outer ends of the fingers one way or the other, as it may be desired to adjust said fingers relative to the shaft. The strips 66$^c$ do not bind the fingers to prevent free oscillatory movements thereof longitudinally of the shaft. The levers 68, 68' are fixed to a shaft 69 near the opposite ends thereof, which shaft is loosely mounted in the upper ends of laterally swinging posts or supports 70, 70, the lower ends of which are pivoted to subjacent brackets 71, as shown in Fig. 2. Mounted on the ends of the shaft 69 without the levers 68, 68' are the pisions 72, 72'; the latter of which meshes with a superimposed rack-bar 73, (see Figs. 1, 3 and 12) which is carried by a yoke-member 74 projecting from the contiguous end of the frame 45, while the former meshes with a superimposed segmental rack 75, which is carried at the under side of a horizontal yoke-bar 76, as shown in Figs. 1 and 3. The levers 68, 68' have weights 77, 77 attached to their lower ends to cause them to normally stand in vertical position with the beater-shaft 65 disposed over the rack-shaft 69 and the lever 68 has an operating-handle 78 projecting from its upper end, as shown in Figs. 2 and 3.

Projecting downwardly and slightly forwardly from the right end of the beater-shaft 65 when in normal position is an arm 79, which has a handle 80 projecting laterally from its lower end and also carries a roller 81 at such end for working on the surface of a bar 82, which forms a track therefor. This track comprises the two differently elevated portions c and d, the former or lower of which is preferably provided with a corrugated surface, as shown, to cause the lever-arm 79 and beater-shaft 65 to have a vibratory or quivering action communicated thereto when the roller 81 passes thereover. A spring-finger 83 bends downwardly from the upper track portion d to near the lower portion c and serves both as a spring bumper for the roller and as a portion of the track over which the roller passes in moving from one elevation to the other. The track 82 is preferably formed of a channel-iron bar, the ends of which are bent upwardly from the outer ends of the track portions c and d and attached to the legs or inwardly bent portions of the yoke-bar 76. A stop-arm 84 projects forwardly from the post 2 in position to coact with the shaft 69 to limit the rearward oscillatory or racking movements of the beater parts to prevent all of such parts, excepting the beater-fingers 66, from having contact with the heddles when the beater mechanism is thrown back as hereinafter described.

The pinion 72 is mounted on a sleeve 85, which is intended to turn freely on the rack-shaft 69 and is prevented from longitudinal movements thereon by the lever 68 and pin 85, see Fig. 9. 87 designates a lock pin, which works through said pinion and into a registering socket in the lever 68 to lock said parts against relative movements. The pin 87 connects at its outer end to the angled lever 88, which has its handle end extending longitudinally of the sleeve 85 and its other end forked and straddling said sleeve and the ends of its forks pivoted to a bracket or arm 89, which is fixed to and projects laterally from the sleeve 85, as shown in Figs. 9 and 10. The pin 87 is normally maintained projected into the socket in the lever 68 by reason of a spring 90 acting against the lever handle 88 and shaft 69.

The far or left ends of the shafts 65 and 69 of the beater mechanism are intended to have very slight horizontal or swinging movements toward or away from the heddle-chain, and serve more as the pivot ends thereof, as it will be noted, by reference to Figs. 1 and 4, that the permissible movement of the right ends of such shafts is very much greater than that of the left ends thereof. It will thus be seen that the woof-wire, while fed to the fabric in contiguous parallelism to the heddle-chain will lie at an angle to the operating face of such chain when beaten home in the fabric, as is indicated in Figs. 1 and 4 by the position of the beater-shaft relative to the face of the chain. The purpose of diverging the beater-mechanism and heddle-chain in this manner is to permit the woof-wires to interweave with the warp-wires close to their rear ends, which would not be possible if the far ends of the woof-wires when beaten home did not stand close to the heddle-chain. In this connection it may be stated that the purpose of contracting the opening between the sets of warp-wires from one side to the other of the fabric is to diminish the lateral bending of the warp-wires between the fabric and heddles in the same ratio that the space between the beater-mechanism and heddles diminishes, thus avoiding a bending of the warp-wires to an angle which would form a permanent set therein, as would be the case if the opening between the sets of warp-wires remained the same throughout the width of the fabric while the distance between a set woof-wire and the heddles lessened. Should a permanent set occur in the warp-wires the cloth would be caused to buckle.

In working the beater-mechanism the operator takes hold of the right end of the shaft 69, which is extended beyond the pinion 72 to form a handle, and after gripping the lever 88 to release the pin 87 from its locking engagement with the lever 68, and moves such shaft end together with the attached parts to the rear until stopped by contact with the stop-arm 84. Near the limit of this rearward movement of the beater parts the roller 81, at the end of the arm 79 moves up the incline 83 to the elevated track portion d, thus effecting a sufficient rocking of the shaft 65 on its trunnions to throw the ends of the beater-fingers 66 in contact with the faces of the registering heddles. A woof-wire having now been fed to the weaving parts in advance of the fingers 66, and the woof-carrier 51 withdrawn, the operator moves the right end of the shaft 69 forward, first releasing the pin 87 from the lever 68 to permit such movement, thus causing the beater parts to horizontally oscillate, with a point at the opposite end of the shaft 69 as its axis, and to move out of parallelism with the front of the heddle-chain, during which oscillatory movement the beater-fingers 66 act on the freshly-fed woof-wire to force it home in the fabric. If desired the shaft 65 may be rocked to cause the fingers 66 to repeatedly strike the woof-wire to beat it in position by an oscillation of the arm 79. In moving the shaft 65 down out of beating position to permit a movement of the warp-wires transversely of the loom, it is simply necessary to throw the lever handle 78 forward, which movement effects a lowering of the beater-shaft 65, a rearward oscillation of the beater-fingers 66, due to the consequent forward movement of the arm 79 on its track, and a slight rearward movement of the shaft 69 due to the pinions 72, 72' turning in their respective racks, which movement is quite essential, as otherwise the beater-shaft 65 could not swing down on a forward arc due to the contact of its fingers 66 with the woof-wire just operated on.

The frame part 45, which is disposed in advance of the beater-mechanism and assists in supporting it, has its top provided with a plurality of short shafts 91, (Fig. 1) which are disposed diagonally of such frame, or at right-angles to the direction of movement of the fabric being woven, and are journaled in suitable bearings 92 rising from the frame. Each of the shafts 91 carries one or more peripherally toothed disks or wheels 93, the teeth of which are intended to work into the mesh of the fabric and feed it forward when turned. The fabric is held to these wheels by means of a strip 94 carrying pressure-rolls 94', which are intended to rest freely on the cloth between the feed-wheels. This strip may be raised or lowered to move the pressure-rolls into or out of engagement with the fabric by means of cam-disks 95, 95 on which its ends rest, see Figs. 1 and 3. These cams are carried by rock-shafts 96, which are journaled in suitable bearings rising from the frame 45 and are provided at like ends with crank-arms 97, which are connected by a rod 98, thus adapting the two shafts to be rocked in unison when a lever-arm 99 on one of said shafts is rocked. The vertical movements of the pressure-strip are guided by pins 100, which project downwardly therefrom into registering sockets in the frame top. A second set of toothed feed-wheels 101 (Fig. 1) are shown as being carried by a shaft 102, which is mounted over an arm 103 of the frame at right angles to the movement of the fabric. The shaft 102 has rotation communicated thereto from the main drive-shaft 104 through the medium of the counter shafts 105 and 106 and the sets of bevel gears 107, 108 and 109, which shafts are mounted in suitable bearings, as shown. The shafts 91 are driven by a shaft 110, which carries bevel-gears in mesh with like gears on the ends of the shafts 91, as at 111, and is in turn driven by bevel-gear connection with the feed-shaft 102, as at 112. The drive shaft 104 is disposed beneath the beater mechanism, and while it may be power-driven if desired, is shown in the present instance as having an end extended to near where the operator stands and as being provided with a ratchet-wheel 113 and coacting ratchet-lever 114 to adapt it for hand operating. This is also shown as being the case with the heddle-chain operating-shaft 11 and the crank-shaft 28, which are shown as being respectively provided at their right ends with ratchet wheels 115 and 116 and coacting ratchet-levers 117 and 118, see Figs. 1 and 2.

Projecting forward from the frame arm 103 are two or more parallel bars 119 on which the fabric feeds forward after leaving the loom frame. The forward ends of these bars are bent downwardly, as shown at 120, Figs. 20 and 21, and terminate adjacent a spool or drum 121 on which the fabric is intended to wind. This spool or drum is carried by a shaft 122, which is shown as being driven from the shaft 105 through the medium of the shaft 123 and sets of bevel-gears 124 and 125, see Figs. 1, 20 and 21.

Figures 20, 21:
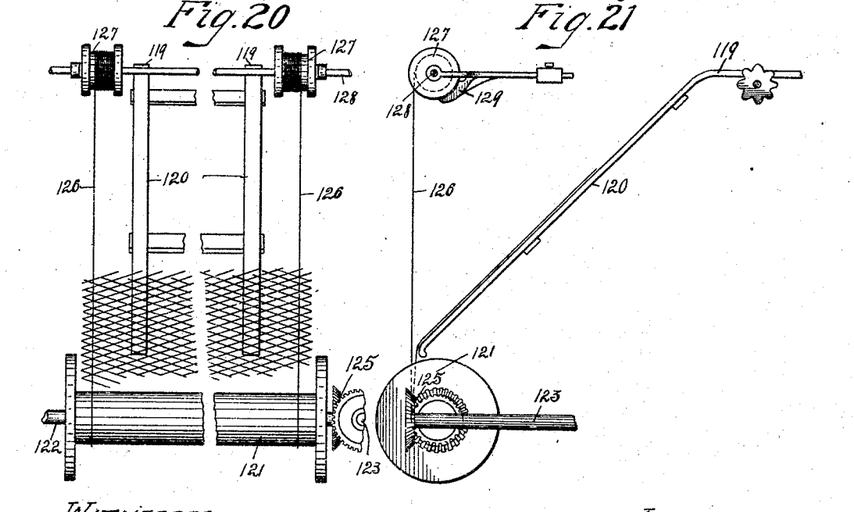

It will be apparent that if the fabric were wound on the spool 121 with the warp and woof-wires standing at right angles to each other, as they are disposed when woven, it would be necessary for said wires to bend to conform to the circumference of the spool. To obviate this as much as possible, the fabric is longitudinally compressed so as to form diamond-shape mesh, as shown in Fig. 20, and to place the woof and warp-wires as nearly parallel to the axis of the spool as possible, thereby reducing the bending of the same to a minimum. For this purpose the shaft 122 on which the spool is mounted is geared to rotate at a slightly slower speed than the forward feed of the fabric to cause the fabric to shorten, as above described, and in order to prevent an opening or broadening of the fabric as it passes around the drum in the winding operation, and to cause it to be tightly wound, I provide one or more binding-threads 126 of wire, or other suitable material, which wind on the spool with the fabric on the outer side of the same, making turn for turn therewith so that each convolution of the fabric is encircled by the binding-thread and thereby caused to closely encompass the preceding convolution of the fabric. The binding-threads 126 feed from spools 127, which are carried above the drum or spool 121 by a shaft 128. The turning of the spools 127 may be frictionally resisted by an adjustable brake-shoe 129, so that the unwinding resistance of the binding-threads will be sufficient to tightly wind the fabric.

130 designates a longitudinally corrugated plate, which is disposed within the path of movement of the heddle-chain and in the line of feed of the warp-wires thereto, thus serving to support the rear or inner ends of such wires against sagging. Bars 131 project laterally from the plate 130 and converge at their opposite ends toward the shaft 5, thus lying substantially in the direction of movement of the warp-wires as they move laterally and forwardly of the loom. This arrangement of the rods prevents the free ends of the warp-wires from lagging and becoming bunched, which would effect a tangling thereof and necessitate a stopping of the loom.

The operation of my invention is as follows:—When the woof-wire has been fed to the loom and beaten home in the fabric, and the beater-mechanism lowered below the horizontal plane of the warp-wires to permit a diagonal movement of the fabric relative to the beater-mechanism and operating portion of the heddle-chain, said chain is moved to the left the distance of one mesh either by manual manipulation of the ratchet-lever 117 on the heddle-chain operating-shaft 111, or by any other suitable means. The fabric is now moved forward diagonally of the beater-mechanism and weaving-portion of the heddle-chain a distance equal to the width of one mesh by a movement of the feed-shaft 104, which communicates motion to the feed-wheels 92 and 101. If this forward movement of the fabric is simultaneous with the movement of the heddle-chain, the warp-wires will move forward in a straight line. Otherwise said wires will be sprung laterally until the fabric has moved forward the distance of a mesh, as it is apparent that a movement of the heddle chain when the fabric is standing still will spring the rear ends of the warp-wires laterally relative to their forward or interwoven ends. During this movement of the fabric the rear end of the warp-wire which was in engagement with the more remote heddle or the one farthest to the left, during the last operation, moves forward out of engagement with such heddle, and at approximately the same time a fresh warp-wire is fed through the eye of the heddle next in succession at the right of the fabric, which eye was moved into register with the warp-wire feed guide 48 by the movement of the chain. It will thus be seen that at each operation or shifting of the heddle-chain a warp-wire feeds out at the left and a new warp-wire feeds into the chain at the right, thereby maintaining a constant number of wires in engagement with the chain during the operation of the loom. A new warp-wire having been fed to the heddle-chain with its forward and rear ends terminating in line with the right and left edges, respectively, of the fabric, as indicated in Fig. 4, the crank-shaft 28 is given a half revolution by a proper manipulation of the ratchet-lever 118, or in any other suitable manner, thus effecting a reversal of the positions of the heddle-operating bars 23, 23' and heddles 21, 21' carried thereby and a consequent vertical shifting of the two sets of warp-wires which are threaded through said heddles, whereby the woof-wire last fed to the fabric is locked therein and the warp-wires placed in proper position for the introduction of another woof-wire. On a shifting of the heddles to change the relative positions of the two sets of woof-wires, the forward end of the warp-wires last fed, which end remains projecting into the feed passage of the guide-nose 48, moved downwardly therefrom between the meeting edges of the two halves of such nose which open by such action, thus leaving said passage free for the feeding of the next warp-wire. The beater-mechanism is now operated to place its beater-fingers 66 in abutment with the alining heddles of the chain and immediately in the rear of the path of movement of the woof-wire carrier across the face of the chain. This is accomplished by the operator swinging the contiguous projecting end of the shaft 69 toward the heddle-chain until brought to a stop by contact with the stop-lug 84, it being understood that the pin 87, which locks the pinion 72 against rotation relative to the lever 68, is first released from said lever by a gripping of the trip-lever 88 to permit said pinion to turn freely on its shaft as it works in mesh with the rack 75. As the roller 81 carried by the arm 79 which projects from the swinging end of the beater-shaft 65 moves into contact with and up the incline 83 of its track, which occurs near the limit of rearward movement of the shaft 69, the beater-shaft 65 is rocked to throw the beater-fingers 66 rearwardly in contact with the heddle-chain, as otherwise the beater-fingers would not stand to the rear of the woof-wire, which is now fed to the loom by the action of the woof-carrier 51. This woof-carrier is shot through the opening between the two sets of warp-wires in contiguous position to the heddle-chain face either by hand or by suitable mechanism (not shown), being guided in such movement by the arm 62, projecting from the post 2, and the guide-fingers 63, which latter are carried by the heddle-chain intermediate the sets of heddle-eyes 46, 46'. At a predetermined point in the advancing movement of the shuttle its nose strikes the stop or trip-member 61 at the left of the loom, thus forcing the plunger 54 inward to effect a release of the woof-wire section, after which the shuttle is withdrawn leaving the woof-wire on the guide-fingers 63 in advance of the beater-fingers 66. The woof-wire is now beaten home in the fabric by swinging the left end of the shaft 69 forward after first releasing the pin 87 from the lever 68 to prevent the shaft 69$^b$ from turning during its swinging movement, as otherwise the far end of the beater-mechanism would be racked forward out of proper beating position due to the working of the pinion 72 at such end in its rack-bar 73.

Should the woof-wire be not evenly beaten into position in the fabric, either end of the beater-mechanism may be brought to act thereon by racking the left end of the shaft 69 to throw it out of parallelism with the woof-wires of the fabric and then oscillating the arm 79 of the beater-shaft 65 to repeatedly strike the woof-wire at the desired point. For instance, should it be desired to only beat the left end of the woof-wire, the pin 87 is released from the lever 68, after which the right end of the shaft 69 is swung slightly to the rear and the operating-handle 78 of the lever 68 oscillated in the same direction, thus causing the left end of the beater-mechanism to swing forwardly due to the forward movement of the pinion 72' in the rack-bar 73 so that a beating action of the beater-fingers 66 will act only on such end of the woof-wire. If the reverse action is desired, the lever-handle 78 is swung forward, thus causing a rearward movement of the far end of the beater-mechanism to permit the right end of the beater-mechanism to operate on the woof-wire. The beating of the woof-wire being accomplished, the beating-parts are moved out of beating position by throwing the lever handle 78 forward, which movement effects a lowering of the beater-shaft 65, a rearward oscillation of the beater-fingers 66, due to the consequent forward movement of the arm 79 on its track, and a slight rearward movement of the shaft 69 due to the pinions 72, 72' turning in their respective racks, which movement is quite essential, as otherwise the beater-shaft could not swing down on a forward arc by reason of the contact of its fingers with the woof-wire just operated on. This lowering of the beater-shaft moves the fingers 66 below the planes of the warp-wires a to permit the cloth to be fed forward and laterally of the loom the distance of one mesh, as above described. Should the ends of the beater-fingers 66 strike against the warp-wires when the beater-mechanism is again raised into beating position the movement of the roller 81 of the beater-shaft arm 79 over the corrugated surface of the track-bar 82 will cause such fingers to quiver and pass on one side or the other of the warp-wires, due to the permissible lateral oscillatory movement thereof as above described. It will be apparent that these operations are successively repeated in proper order during the continued weaving operation.

It will be noted that the sets of heddle-eyes 46, 46' converge toward the left of the loom and also that the beater-parts and heddle-chain relatively converge toward such end. These are very important features in the practical and successful operation of a loom of this class, as they enable woof-wires to interweave with the warp-wires close to their rear ends, thus reducing the waste of material to a minimum, as otherwise the cloth would be woven with a broad ragged edge at such side which would need to be trimmed off before rolling in a bundle for shipping, and also preventing a permanent set from occurring in the rear ends of the warp-wires, which set would be occasioned by a broad range of movement of the heddles at such side of the fabric. This setting of the warp-wire ends would make the cloth buckle where such setting occurs.

It will be apparent that my invention in its broader aspect may be embodied in numerous forms, and may be hand operated or made automatic in its action without departing from the spirit or scope of the same. I therefore desire it to be understood that the invention is not limited to any specific form or arrangement of parts except in so far as such limitations are specified in the claims.

Having thus described my invention, what I claim as new, and desire to secure by Letters Patent, is,—

1. In a loom of the class described, the combination of a plurality of heddles capable of relative longitudinal movements, and means capable of transversely moving the heddles in unison across the length of the fabric.

2. In a loom of the class described, the combination of parallel sets of relatively movable heddles, and means capable of moving said heddles in unison to shift their positions relative to the fabric being woven and transversely across the length of the fabric.

3. In a loom of the class described, an endless heddle-chain having an angled course of movement, and means operative to impart step by step movement to the chain across the length of the fabric.

4. In a loom of the class described, the combination of an endless heddle-chain, the heddles of which are relatively movable transversely thereof, and means for relatively moving different of the heddles in unison.

5. In a loom of the class described, the combination of an endless heddle-chain for carrying the warp-wires, the heddles of which chain are relatively movable transversely thereof, and means movable to impart opposed movements to different of the heddles during a predetermined portion of their movements with the chain.

6. In a loom of the class described, the combination of an endless heddle-chain, the heddles of which are capable of relative parallel longitudinal movements, and means movable to impart such movements to different of the heddles.

7. In a loom of the class described, the combination of a plurality of heddles joined together to form an endless chain, and capable of relative longitudinal movements, means for intermittently moving the chain, and means for imparting simultaneous opposed longitudinal movements to different of the heddles during a portion of their movements with the chain.

8. In a loom of the class described, the combination of a plurality of heddles laterally joined together to form an endless chain and capable of relative longitudinal movements, said chain being longitudinally movable, and means for imparting simultaneous opposed longitudinal movements to a plurality of alternate heddles when at a predetermined point in the movement of the chain.

9. In a loom of the class described, the combination of a longitudinally movable heddle-chain having its heddles capable of relative transverse movements, and means for imparting opposed movements transversely of the chain to a plurality of alternate heddles.

10. In a loom of the class described, the combination of a longitudinally movable heddle-chain having its heddles capable of relative transverse movements, and means operative to act on the heddles to impart opposed movements transversely of the heddle-chain to a plurality of alternate heddles the number of which remains approximately constant while the members thereof change with a longitudinal movement of the chain.

11. In a loom of the class described, the combination of a longitudinally movable heddle-chain, said chain comprising two sets of heddles the members of which alternate and are relatively movable transversely of the chain, and means operative to act on a plurality of the successive heddles of each set to impart opposed movements thereto transversely of the chain.

12. In a loom of the class described, the combination of an endless longitudinally movable heddle-chain having two sets of heddles, the members of which are relatively movable transversely of the chain, and means for imparting opposed movements transversely of the chain to portions of the sets of heddles which change as the chain moves.

13. In a loom of the class described, the combination of an endless longitudinally movable heddle-chain having its heddles relatively movable transversely thereof, and means capable of acting on a plurality of successively arranged heddles for imparting opposed differential movements to different ones thereof.

14. In a loom of the class described, the combination of an endless longitudinally movable heddle-chain, the heddles of which are relatively movable transversely of the chain, and means operative to impart opposed movements transversely of the chain to different ones of a plurality of successively arranged heddles, the opposed movements of such heddles being gradually lessened from one end to the other of the set of heddles operated on.

15. In a loom of the class described, the combination of an endless heddle-chain having two sets of alternately arranged heddles which are relatively movable transversely of the chain, and means capable of acting on a plurality of successive heddles of the two sets to impart opposed movements to the heddles of said sets and different movements in the same direction to the heddles of the same set whereby the opposed movements of the heddles gradually lessen from one end to the other of the portion of the chain acted on.

16. In a loom of the class described, the combination of an endless heddle-chain having its heddles relatively movable transversely thereof, relatively movable parts disposed adjacent the path of movement of the chain and adapted to act on different ones of a plurality of successively arranged contiguous heddles to give simultaneous opposed movements transversely of the chain.

17. In a loom of the class described, the combination of an endless heddle-chain, the heddles of which are relatively movable transversely thereof, relatively movable parts disposed adjacent the path of movement of the chain and adapted to act on different ones of a plurality of successively arranged heddles, and means for imparting relative movements to said parts whereby the heddles acted on have opposed differential movements transversely of the chain.

18. In a loom of the class described, the combination of an endless heddle-chain having its heddles relatively movable and through which the warp-wires of the fabric being woven are projected when the heddles are traversing a straight portion of their course of movement with the chain, and means for relatively shifting the heddles carrying alternate wires to reverse the positions of the two sets of alternate wires.

19. In a loom of the class described, the combination of an endless heddle-chain, the heddles of which are relatively movable and adapted to have the warp-wires of a fabric projected therethrough when the heddles are traversing a predetermined portion of the course of movement of the chain, separate means for coacting with the heddles carrying alternate wires, and means for relatively moving said separate means to shift the heddles carrying alternate wires to reverse the positions of the two sets of wires and cause the opening between the shifted wires to gradually contract toward one end.

20. In a loom of the class described, the combination of an endless heddle-chain, the heddles of which are relatively movable and divided into two sets, a track for the chain having different portions thereof coacting with the different sets of heddles and relatively movable, and means for shifting said track portions to impart opposed movements to the heddles of the two sets passing thereover.

21. In a loom of the class described, the combination of an endless heddle-chain, the heddles of which are divided into two sets and relatively movable, a track for the chain having different portions thereof coacting with the different sets of heddles and relatively movable, and means for shifting said track portions for imparting opposed movements to the heddles of the two sets passing thereover and differential movements to the heddles of the same set passing thereover.

22. In a loom of the class described, the combination of an endless heddle-chain, the heddles of which are relatively movable, relatively movable parts coacting with different continguously arranged heddles, and mechanism operative to impart opposed oscillating reciprocatory movements to said parts.

23. In a loom of the class described, the combination of an endless heddle-chain having a portion of its course of movement disposed diagonally of the movement of the fabric, the heddles of the chain being relatively movable, and means for imparting opposed movements to different of a series of successive heddles disposed in such diagonal course of movement.

24. In a loom of the class described, the combination of an endless heddle-chain, the heddles of which are relatively movable and arranged in sets, a track for the chain having parallel relatively movable bars for operating on the heddles of the different sets, and means for imparting opposed movements to said bars to reverse the positions of the heddles of the two sets, the opposed movements of said bars being greater at one end than the other thereof.

25. In a loom of the class described, the combination of an endless heddle-chain, the heddles of which are relatively movable, means for intermittently moving said chain, relatively movable parts for coöperating with a plurality of different contiguously arranged heddles, and means operative to impart opposed oscillating reciprocatory movements to said parts.

26. In a loom of the class described, the combination of an endless heddle-chain, and means for feeding warp-wire sections to the heddles as they pass a predetermined point in their movement with the chain, the direction of feed of such wires being diagonal to the direction of movement of the fabric from the loom.

27. In a loom of the class described, the combination of an endless heddle-chain, the heddles of which are relatively movable and arranged in sets, means for feeding warp-wire sections to the heddles at a point in their movement with the chain, and means for moving the warp-wire-carrying heddles of the sets to relatively shift the positions of the wires carried by the sets of heddles.

28. In a loom of the class described, the combination of an endless heddle-chain which is guided to have a portion of its movement diagonal to the fabric being woven and at right-angles to the feed of the warp-wire sections, and means for feeding warp-wire sections to the heddles when at a point in said diagonal course of movement.

29. In a loom of the class described, the combination of an endless heddle-chain, the heddles of which are relatively movable, means for feeding warp-wire sections to the heddles, and means for imparting opposed movements to alternate warp-wire carrying heddles to shift the warp-wires.

30. In a loom of the class described, the combination of an endless heddle-chain having an angled course of movement, the heddles of said chain being relatively movable, means for feeding warp-wire sections to the heddles as they pass a point in the movement of the chain, and means for imparting opposed movements to alternate ones of the warp-wire carrying heddles to shift the warp-wires, said opposed movements gradually diminishing from one side to the other of the fabric being woven.

31. In a loom of the class described, the combination of an endless heddle-chain, and means for feeding warp-wire sections to the heddles of the chain in a direction opposed to the direction of movement of said sections through the heddles when moving forward with the fabric.

32. In a loom of the class described, the combination of an endless heddle-chain and means for feeding warp-wire sections to each heddle when at a predetermined point in its movement with the chain, said chain having a portion guided for movement diagonally of the fabric being woven whereby a warp-wire section leaves its heddle at one side of the fabric at approximately the same time a new section is fed into a heddle at the other side of the fabric.

33. In a loom of the class described, the combination of an endless heddle-chain, means guiding the chain to have an angled course of movement across the length of the fabric, and a track for the chain.

34. In a loom of the class described, the combination of an endless heddle-chain, means guiding the chain to have an angled course of movement, a portion of which movement is diagonal to the length of the fabric being woven, and a track for the chain.

35. In a loom of the class described, the combination of an endless heddle-chain, the heddles of which are relatively movable, means guiding the chain to have an angled course of movement, and a track for the chain having portions thereof movable to move the heddles lengthwise when passing thereover.

36. In a loom of the class described, the combination of an endless heddle-chain, the heddles of which are relatively movable, rollers carried by the heddles, and a track on which said rollers travel to control the relative movements of the heddles.

37. In a loom of the class described, the combination of an endless heddle-chain, the heddles of which are relatively movable transversely of the chain, rollers carried by the heddles, and a track on which said rollers travel, said track having parts movable to effect a movement transversely of the chain of the heddles passing thereover.

38. In a loom of the class described, the combination of an endless heddle-chain, the heddles of which are relatively movable transversely of the chain, rollers carried by the heddles, and a track over which the heddle rollers travel, said track having parts relatively movable to communicate opposed movements transversely of the chain to different of the heddles passing thereover.

39. In a loom of the class described, the combination of an endless heddle-chain, the heddles of which are relatively movable and arranged to form two parallel sets, a track over which the heddles travel, said track having differentially movable parallel parts on which the sets of heddles respectively travel, and means for moving said parts to impart opposed movements to the heddles of the different sets and differential movements to the heddles of the same set.

40. In a loom of the class described, the combination of an endless heddle-chain, the heddles of which are relatively movable, means for feeding warp-wire sections to the heddles at a point in the movement of the chain, means for imparting opposed movements to alternate warp-wire carrying heddles to shift the warp-wires to provide an opening between the two spaced sets thereof, and means for feeding a woof-wire between the sets of warp-wires and contiguous to the chain.

41. In a loom of the class described, the combination of means for feeding short woof-wire sections diagonally of the length of the fabric being woven, and means for forcing the woof-wire sections into position in the fabric.

42. In a loom of the class described, the combination of means for feeding woof-wires diagonally to the length of the fabric being woven, oscillatory beater-mechanism for acting on the woof-wires to beat them in position in the fabric and means for imparting a vibratory movement to said mechanism during a predetermined portion of its movement.

43. In a loom of the class described, the combination of an endless heddle-chain having one plane of its movement diagonal to the fabric being woven, means for feeding woof-wire sections to the fabric in contiguous parallelism with such diagonal portion of the chain, and a beater-mechanism adapted to be placed in parallelism with said diagonal portion of the chain and adapted to have an oscillatory movement when beating a woof-wire section into position in the fabric.

44. In a loom of the class described, the combination of an endless chain having a portion of its movement diagonal to the length of the fabric being woven, means for feeding warp-wire sections to the heddles at one side of the fabric, means for intermittently moving the chain, means for feeding woof-wire sections to the fabric in advance of said diagonal portion of the chain, means for beating the woof-wire into position in the fabric, and means for intermittently moving the fabric forward a distance equal to the width of a mesh thereof.

45. In a loom of the class described, the combination of a heddle-chain, means for feeding warp-wire sections to the heddle-chain diagonally to the length of the fabric, and means for feeding woof-wire sections to the fabric in angular relation to the warp-wire sections and to the length of the fabric.

46. In a loom of the class described, the combination of a plurality of laterally connected heddles, and separate means for feeding warp-wire sections to the heddles and woof-wire sections at right angles to the warp-wire sections and diagonally of the direction of weaving the fabric.

47. In a loom of the class described, the combination of a plurality of laterally connected heddles capable of relative longitudinal movements, means for imparting intermittent transverse movements to certain heddles in unison, means for feeding a warp-wire section to each heddle as it passes a predetermined point in its transverse movement, means operative to impart opposed longitudinal movements to different of the heddles carrying warp-wires whereby to shift the warp-wires to adapt them for the feeding of a woof-wire thereto, means for feeding woof-wire sections diagonally to the fabric and at right angles to the warp-wire sections, means for beating the woof-wire sections home, and means for intermittently moving the fabric forward a distance of one mesh.

48. In a loom of the class described, the combination of a heddle-chain, means for moving the heddle-chain over its course of movement, and means for feeding the fabric forward at an oblique-angle to the weaving portion of the chain.

49. In a loom of the class described, the combination of a heddle-chain, means for moving the heddle-chain over its course of movement, and means for feeding the fabric forward at an oblique-angle to the weaving portion of the chain and simultaneous with the movement of the chain.

50. In a loom of the class described, a woof-wire beating-mechanism, having beating parts means for giving both oscillatory and racking movements to said parts.

51. In a loom of the class described, a woof-wire beating-mechanism, having beating parts means for giving oscillatory beating movements to said parts, and means for racking the pivotal end of the beating parts.

52. In a loom of the class described, the combination of a woof-wire beating-mechanism, and means for causing one end only of the beating parts to operate on the fabric.

53. In a loom of the class described, the combination of the woof-wire beating mechanism, and means for causing either end of the beating parts to operate on the fabric.

54. In a loom of the class described, the combination of a woof wire beating mechanism having beater parts, means for lifting the said beater parts into position for operation, and means for giving an oscillatory movement to the beater parts.

55. In a loom of the class described, the combination of woof wire beating members, means for rocking said members on a horizontal axis to beat the woof wire, and means for moving said members into position for operation on the said woof wire.

56. In a loom of the class described, the combination of woof wire beating parts, and means for moving the said parts transverse to the length of the fabric to beat a woof wire.

57. In a loom of the class described, the combination of woof wire beating parts, means for moving the said parts transverse to the length of the fabric to beat a woof wire, and means for lowering said beating parts below said fabric.

58. In a loom of the class described, the combination of a beater-shaft having fingers projecting therefrom, said shaft normally standing with the fingers projecting upwardly, and means for moving the shaft longitudinally of the fabric into position to beat a woof-wire home.

59. In a loom of the class described, the combination of a shaft, woof wire beater members carried by said shaft, means for rocking said beaters about said shaft to lift said beaters in operable position, and means for operating on said beater members to beat the woof wires.

60. In a loom of the class described the combination of a shaft, an oscillatory support for said shaft, a woof-wire beating part carried by said shaft for oscillatory movements therewith and rocking movements relative thereto, and means for moving either end of the shaft lengthwise of the fabric.

61. In a loom of the class described, a beater-mechanism disposed diagonally of the fabric, said mechanism having a horizontally oscillatory part, a member carried by said oscillatory part and movable therewith, said member carrying beater-fingers and capable of movement in the arc of a circle with said part, and means for controlling the movement of said member relative to said part.

62. In a loom of the class described, the combination of an oscillatory shaft, levers fixed in spaced relation to said shaft, and being adapted to normally stand in vertical position, and a beater-member carried by said levers at one side of said shaft and adapted to have lateral oscillatory movements with said shaft as its axis.

63. In a loom of the class described, a shaft capable of having woof-wire beater movements imparted thereto, levers carried in spaced relation by said shaft and adapted to normally stand in vertical position, a beater-member carried by said levers and capable of rocking relative thereto, an arm projecting from said beater-member, and means for racking the end of said shaft.

64. In a loom of the class described, the combination of an oscillatory shaft, fixed racks disposed at opposite ends of the shaft, pinions carried by the shaft and meshing in said racks, one of said pinions being loose on the shaft, means for locking such pinion against rotation relative to the shaft, levers fixed in spaced relation to the shaft and adapted to normally hang in vertical position, a beater-shaft having eccentric end trunnions journaled in said levers at one side of the shaft, beater-fingers projecting from said shaft, a track disposed near the swinging end of said oscillatory shaft, and an arm projecting from the beater-shaft and having its outer end working on said track whereby the beater-shaft is rocked at a predetermined point in a swinging movement of the oscillatory shaft.

65. In a machine for weaving diagonal strand fabric, the combination with a support arranged to receive the completed fabric woven by the machine and means for temporarily holding said fabric in place, of harness mechanism arranged approximately parallel with one series of the diagonal strands of the fabric and having slidable wire guiding heddles movable from end to end of said harness mechanism, and a batten extending approximately parallel with said harness.

66. In a diagonal strand wire loom, in combination, fabric receiving means, harness mechanism comprising a pair of open-ended trackways arranged obliquely to the line of travel of the completed fabric, movable heddles connected in groups and adapted to enter, be moved the length of and clear the said trackways, means for vertically moving the trackways to form a shed, and a batten arranged parallel with the said trackways.

In testimony whereof I have hereunto signed my name to this specification in the presence of two subscribing witnesses.

OLIN W. BENSTER.

Witnesses:
C. W. OWEN,
CORNELL SCHIERBLE.